US008706799B2

(12) United States Patent
Mergi et al.

(10) Patent No.: US 8,706,799 B2
(45) Date of Patent: Apr. 22, 2014

(54) METHOD AND APPARATUS TO EXCHANGE INFORMATION WITH A LOCAL STORAGE DEVICE

(75) Inventors: Aryeh Mergi, Hod Hasharon (IL); Eyal Bychkov, Hod Hasharon (IL); Aran Ziv, Natanya (IL)

(73) Assignee: Sandisk IL Ltd., Kfar Saba (IL)

( * ) Notice: Subject to any disclaimer, the term of this patent is extended or adjusted under 35 U.S.C. 154(b) by 587 days.

(21) Appl. No.: 11/707,971

(22) Filed: Feb. 20, 2007

(65) Prior Publication Data
US 2007/0276949 A1    Nov. 29, 2007

Related U.S. Application Data

(60) Provisional application No. 60/803,370, filed on May 29, 2006.

(51) Int. Cl.
*G06F 15/16*    (2006.01)

(52) U.S. Cl.
USPC ........... 709/203; 709/201; 709/219; 709/226; 709/229; 709/250

(58) Field of Classification Search
USPC .......... 709/202–205, 217–219, 225–229, 250
See application file for complete search history.

(56) References Cited

U.S. PATENT DOCUMENTS

| 5,918,013 | A  | * | 6/1999  | Mighdoll et al. | ............. | 709/217    |
|-----------|----|---|---------|-----------------|---------------|------------|
| 6,061,692 | A  | * | 5/2000  | Thomas et al.   | ..........    | 707/999.01 |
| 6,315,668 | B1 | * | 11/2001 | Metke et al.    | .....................  | 463/42 |
| 6,366,912 | B1 | * | 4/2002  | Wallent et al.  | ................  | 709/219 |
| 7,155,519 | B2 | * | 12/2006 | Lo et al.       | ........................  | 709/203 |
| 7,159,007 | B2 | * | 1/2007  | Stawikowski     | ................. | 709/218 |
| 7,185,030 | B2 | * | 2/2007  | Kodama          | ....................| 707/999.01 |
| 7,437,364 | B1 | * | 10/2008 | Fredricksen et al. | ........ | 709/201 |
| 7,512,666 | B2 | * | 3/2009  | Zhou            | ............................. | 709/217 |

(Continued)

FOREIGN PATENT DOCUMENTS

| CN | 1650596 A | 3/2005 |
|----|-----------|--------|
| EP | 0866590   | 9/1998 |

(Continued)

OTHER PUBLICATIONS

U.S. Appl. No. 11/642,897, filed Dec. 2006, Ziv and Pomerantz.

(Continued)

*Primary Examiner* — Bharat N Barot
(74) *Attorney, Agent, or Firm* — Toler Law Group, PC

(57) ABSTRACT

A data-processing system includes a storage device for running a local web-server residing in the storage device; a host device for connecting to the storage device; and an exchanging mechanism, residing in the host device, for exchanging information autonomously between the local web-server and a remote web-server connected to the host device. Preferably, the local web-server serves a host application, upon a host-application request for information when the local web-server cannot obtain the information, by retrieving the information autonomously from the remote web-server via an LWSA. Preferably, the exchanging mechanism exchanges data packets between the local web-server and the remote web-server. Preferably, the storage device initiates the exchanging of the information upon indication of available bandwidth for network communication. More preferably, the storage device prioritizes the exchanging of the information according to a protocol that takes into account statistics of data usage according to temporal parameters of the data usage.

23 Claims, 5 Drawing Sheets

(56) References Cited

U.S. PATENT DOCUMENTS

| | | | |
|---|---|---|---|
| 7,689,667 B2* | 3/2010 | Lal | 709/218 |
| 7,801,981 B2* | 9/2010 | Setogawa et al. | 709/203 |
| 8,000,474 B1* | 8/2011 | Evans et al. | 380/205 |
| 2002/0156862 A1 | 10/2002 | Zhou | |
| 2003/0014477 A1* | 1/2003 | Oppenheimer et al. | 709/203 |
| 2005/0021796 A1* | 1/2005 | McClain et al. | 709/229 |
| 2007/0220009 A1* | 9/2007 | Morris et al. | 707/10 |

FOREIGN PATENT DOCUMENTS

| | | | |
|---|---|---|---|
| EP | 1211861 | 6/2002 | |
| FR | 2793576 | 11/2000 | |
| GB | 2349546 | 11/2000 | |
| GB | 350973 | 12/2000 | |
| JP | 2005-524898 A | 8/2005 | |
| WO | WO02/060154 | 8/2002 | H04L 29/06 |
| WO | WO02/100117 | 12/2002 | |
| WO | 03094474 A1 | 11/2003 | |
| WO | WO03/094474 | 11/2003 | H04L 29/06 |
| WO | 2006032993 A2 | 3/2006 | |

OTHER PUBLICATIONS

U.S. Appl. No. 11/655,866, filed Jan. 2007, Ziv et al.

Jiang Z. et al. "Web Prefetching in a Mobile Environment" IEEE Personal Communications Society US vol. 5 No. 5 Oct. 1998 pp. 25-34.

International Search Report and Written Opinion of International Application No. PCT/IL2007/000644, dated Nov. 22, 2007, 18 pages.

Non-Final Office Action mailed Mar. 3, 2011 in U.S. Appl. No. 12/823,023, 9 pages.

EP Examination Report dated Jan. 20, 2011 issued in European Patent Application No. 07736384.4, 12 pages.

Translation of Office Action issued on May 9, 2011 in Chinese Patent Application No. 200780003938.7, 6 pages.

Final Office Action mailed Aug. 10, 2011 in U.S. Appl. No. 12/823,023, 10 pages.

Non-Final Office Action mailed Feb. 2, 2012 in U.S. Appl. No. 12/823,023, 10 pages.

Office Action mailed Feb. 24, 2012 issued in Chinese Patent Application No. 200780003938.7 with English translation, 14 pages.

Office Action issued Apr. 20, 2012 in Japanese Patent Application No. 2009-512770 with English translation, 11 pages.

Non-Final Office Action mailed Jul. 13, 2012 in U.S. Appl. No. 12/823,023, 9 pages.

Office Action issued Sep. 5, 2012 in Chinese Application No. 200780003938.7, with English translation, 7 pages Final Office Action mailed Feb. 4, 2013 in U.S. Appl. No. 12/823,023, 13 pages.

Office Action issued Jan. 5, 2013 in Chinese Application No. 200780003938.7, with English translation, 17 pages.

Office Action issued Jan. 25, 2013 in Japanese Application No. 2009-512770, with English translation, 7 pages.

Urien, Pascal. "Internet Card, A Smart Card As a True Internet Node," Elsevier Computer Communications, Nov. 1, 2000, vol. 23, Issue 17, pp. 1655-1666.

Notification of Grounds for Refusal issued Jul. 15, 2013 in Korean Application No. 10-2008-7020690, with English translation, 9 pages.

Non-Final Office Action mailed Aug. 29, 2013 in U.S. Appl. No. 12/823,023, 11 pages.

\* cited by examiner

METHOD AND APPARATUS TO EXCHANGE INFORMATION WITH A LOCAL STORAGE DEVICE

This patent application claims the benefit of U.S. Provisional Patent Application No. 60/803,370 filed May 29, 2006.

FIELD AND BACKGROUND OF THE INVENTION

The present invention relates to systems and methods for providing a local web-server that synchronizes the update of information in a storage device.

Emulation of a web-server in a storage device is well-known in the art of computer engineering. Such emulation is typically done by saving one or more web pages (or a part of them) in a local storage device, and then accessing the web content using a local web-server, running on the same storage device. This provides independent operation and total portability.

While the prior-art emulators provide a true "web experience", they differ from true network-based web-servers in one very important aspect: They cannot be automatically updated "in the background" (i.e. without host-system initiation). Furthermore, the data stored in a local web-server may be of a nature that requires frequent updating in order to be relevant (e.g. weather reports, traffic conditions, stock quotes, etc.). A lack of frequent updating can render the data misleading or useless.

Prior-art examples of SIM (i.e. subscriber identity module) cards that act as "web-servers" for a host device are available from Samsung Electronics Co., Ltd. (Taepyong-ro, Jung-gu, Seoul, South Korea) and Gemalto N. V. (formerly Axalto Holding N. V., Joop Geesinkweg, Amsterdam, The Netherlands). While these SIM cards feature data storage capacity with a "server-like" capability, they cannot perform the task of using the host device as a medium to reach an internet (or other external data sources), obtain new information, and incorporate the information into a data response for an application request. (The term "internet" is used herein to refer to a collection of interconnected computer networks. The best known internet is the worldwide Internet.) Such prior-art devices are not truly web-servers in the sense that such devices cannot directly access an internet. In addition, these SIM cards do not offer functionality to access internet resources through a mobile phone.

It would be desirable to have a local web-server that is capable of serving the user off-line and on-line, and which could also use any on-line opportunity to autonomously synchronize the web-server data with other available data sources. The term "autonomous" in this context means that the host device serves only as a gateway, providing communication between the local web-server and the data sources. However, in other situations the host device can run client applications (e.g. a web browser) to provide an MMI (i.e. man-machine interface) to the data and applications stored in the storage device or retrieved from an internet.

SUMMARY OF THE INVENTION

It is the purpose of the present invention to provide systems and methods for providing a local web-server that synchronizes the update of information in a storage device.

For the purpose of clarity, several terms which follow are specifically defined for use herein. The term "web-server" is used herein to refer to a network-based computer (typically called a "server") that provides a client computer (or storage device) with data in the form of web pages, databases, or web applications accessible through client-web applications via direct access to an internet. The term "local web-server" is used herein to refer to a web-server that provides local data (i.e. data that resides in the client computer/storage device). The term "storage device" is used herein to refer to a device that can store data and has memory-caching capabilities. Such a storage device can be, for example, a SIM card, a memory card, a UFD (i.e. USB flash disk), or a storage device mounted on-board the host device.

The term "host device" is used herein to refer to a device to which the storage device is connected such as, for example, a mobile phone, a PC (i.e. personal computer), a CarPC, and a network-connected terminal computer. The terms "local web-server agent" and "LWSA" are used herein to refer to an element (hardware and/or software) that resides in a host device, and manages data communication between a storage device connected to the host device and a communication stack serving the host device to communicate with an external network, where there is at least one application running on the host device.

The term "host application" is used herein to refer to a software application (e.g. a web browser or an email program) running on a host device. The term "data usage" is used herein to refer to a usage of predictable data items that a user is likely to access based on habits, keywords, or other prescribed criteria. The term "temporal parameters" is used herein to refer to certain times, days, dates, and locations. The term "autonomously" is used herein to refer to an exchange of information without the involvement of a host application other than a LWSA.

The present invention teaches systems and methods for providing a local web-server that synchronizes the update of information in a storage device. To the host device and the user, this web-server appears as an updated, readily-accessible web-server, serving the host device with web pages and web applications like an ordinary, network-based, ASP (i.e. active server pages) web-server.

While serving the host device as a web-server, the storage device uses the host device as a gateway for synchronization with an external data repository/web-server whenever there is a need, and/or an opportunity to synchronize data. The "need" to synchronize data occurs whenever an application needs data that is not available in the local web-server, or whenever the remote web-server has new data, that is relevant to the local web-server, needing to be sent. The "opportunity" to synchronize data occurs whenever there is idle bandwidth on the network connection. Using such an "opportunity" reduces the risk of encountering such a "need". Such a "need" occurs whenever data is explicitly required by an application running on the host device, either as a response to a user action or an application operation.

The innovative approach of the present invention enables the local web-server to function without necessitating a direct connection between the storage device and the network, and to perform the synchronization without necessitating initiation by the host device. An innovative aspect of the present invention is enabling the local web-server to reside in a storage device, such as a SIM card, rather than in the host device, such as a mobile phone, and enabling the local web-server to perform its internal web-server applications and data synchronization while using the host device as a communication gateway to external data sources.

There are several potential advantages in maintaining the local web-server in a storage device, such as the four advantages listed below, but prior-art local web-servers, being totally dependent upon host applications for synchronization, are limited in exploiting these advantages. The present invention, offering self-managed synchronization of the local web-server, provides these advantages with better performance, and without the necessity of modification to any host application.

(1) Having the application and application data stored in the storage device, as in the present invention, enables high-level functionality when a network connection is not available by serving the application and the data from the storage device at the cost of not being updated. Furthermore, the present invention maintains performance, as in the prior art, while providing better update rates. Thus, in contrast to the prior art, the approach of the present invention always provides the application with the most recent data, whether the system is off-line or on-line. In the off-line case, the application receives the most recent data in the storage device. In the on-line case, the application receives the most recent data from the remote data source.

(2) Having the application and application data stored in the storage device, as in the present invention, enables significantly faster response time to the user and to host applications at the cost of not being updated. Furthermore, the present invention maintains faster response time, as in the prior art, while providing better update rates. Thus, in contrast to the prior art, the approach of the present invention reduces such response times by having the data stored locally in the storage device.

(3) As modern web-applications involve controlled distribution of content and digital rights-management considerations, it is important to enable a publisher of content and applications to control their use. By keeping the web-server emulator in the storage device, like a SIM card (as in the present invention) that can be under the control of a mobile network operator (MNO), the present invention enables proper control and billing for the use of such content. In such a scenario, the MNO could be the retailer of the content provider, or a representative of the retailer.

(4) As the host device typically hosts applications that require fast response time, such as playing music and video, it is useful to off-load tasks that do not require such fast response time, such as web updates, to the storage device. The present invention enables a storage device to perform such web synchronization, and to save precious processing bandwidth for the host device.

Therefore, according to the present invention, there is provided for the first time a digital data-processing system including: (a) a storage device for running a local web-server residing in the storage device; (b) a host device configured to be reversibly operationally connected to the storage device; and (c) an exchanging mechanism, residing in the host device, for exchanging information autonomously between the local web-server and a remote web-server operationally connected to the host device.

Preferably, the storage device and the host device are configured to communicate while the exchanging mechanism is exchanging the information.

Preferably, the host device includes an LWSA as an interface between the host device and the exchanging mechanism, the LWSA configured to initiate the exchanging of the information. The LWSA may be implemented either in software or in hardware, or in a combination hardware-software module that interfaces with applications in the host device, a communication stack in the host device, and the storage device.

Preferably, the local web-server is operative to serve a host application, upon a host-application request for the information when the local web-server cannot obtain the information, by retrieving the information autonomously from the remote web-server via an LWSA.

Preferably, the exchanging mechanism is operative to exchange data packets between the local web-server and the remote web-server.

Preferably, the remote web-server is configured to initiate the exchanging of the information.

Preferably, the storage device is configured to initiate the exchanging of the information upon indication of available bandwidth for network communication.

More preferably, the storage device is operative to prioritize the exchanging of the information according to a protocol.

Most preferably, the protocol takes into account statistics of data usage according to at least one temporal parameter of the data usage. Examples of temporal parameters include: times, days, dates, and locations of the data usage.

Most preferably, the protocol takes into account transactions between the host device and the storage device.

Preferably, the host device includes an internal communication link between a communication stack and a device manager for exchanging the information with the remote web-server.

Most preferably, the internal communication link is operative to exchange data packets of the information, between the host device and the remote web-server, via an LWSA.

According to the present invention, there is provided for the first time a host device for reversibly hosting a storage device, the host device including: (a) a memory for storing a host application; (b) a communication stack for said host application to manage communication, with a remote web-server, initiated by the storage device; and (c) a device manager for providing data from the remote web-server to the storage device.

Preferably, the communication stack is configured to communicate with the host application by exchanging data packets.

Preferably, the device manager is configured to communicate with the host application, the communication stack, and the storage device by exchanging data packets.

According to the present invention, there is provided for the first time a storage device including: (a) an interface for effecting a reversible operational connection to a host device; and (b) a local web-server configured to initiate exchange of information with a remote web-server via the interface.

Preferably, the storage device is a flash-memory device or a SIM card.

According to the present invention, there is provided for the first time a method for providing web-hosting services to a storage device from a host device, the method including the steps of: (a) installing a local web-server in the storage device; (b) operationally connecting the storage device to the host device; (c) operationally connecting the host device to a network; and (d) exchanging information autonomously between the local web-server and a remote web-server through the host device.

Preferably, the step of exchanging is performed by exchanging data packets between the local web-server and the remote web-server, and is initiated by the local web-server.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to systems and methods for providing a local web-server that synchronizes the update of information in a storage device. The principles and operation for providing such a local web-server, according to the present invention, may be better understood with reference to the accompanying description and the drawings.

Figure 1:
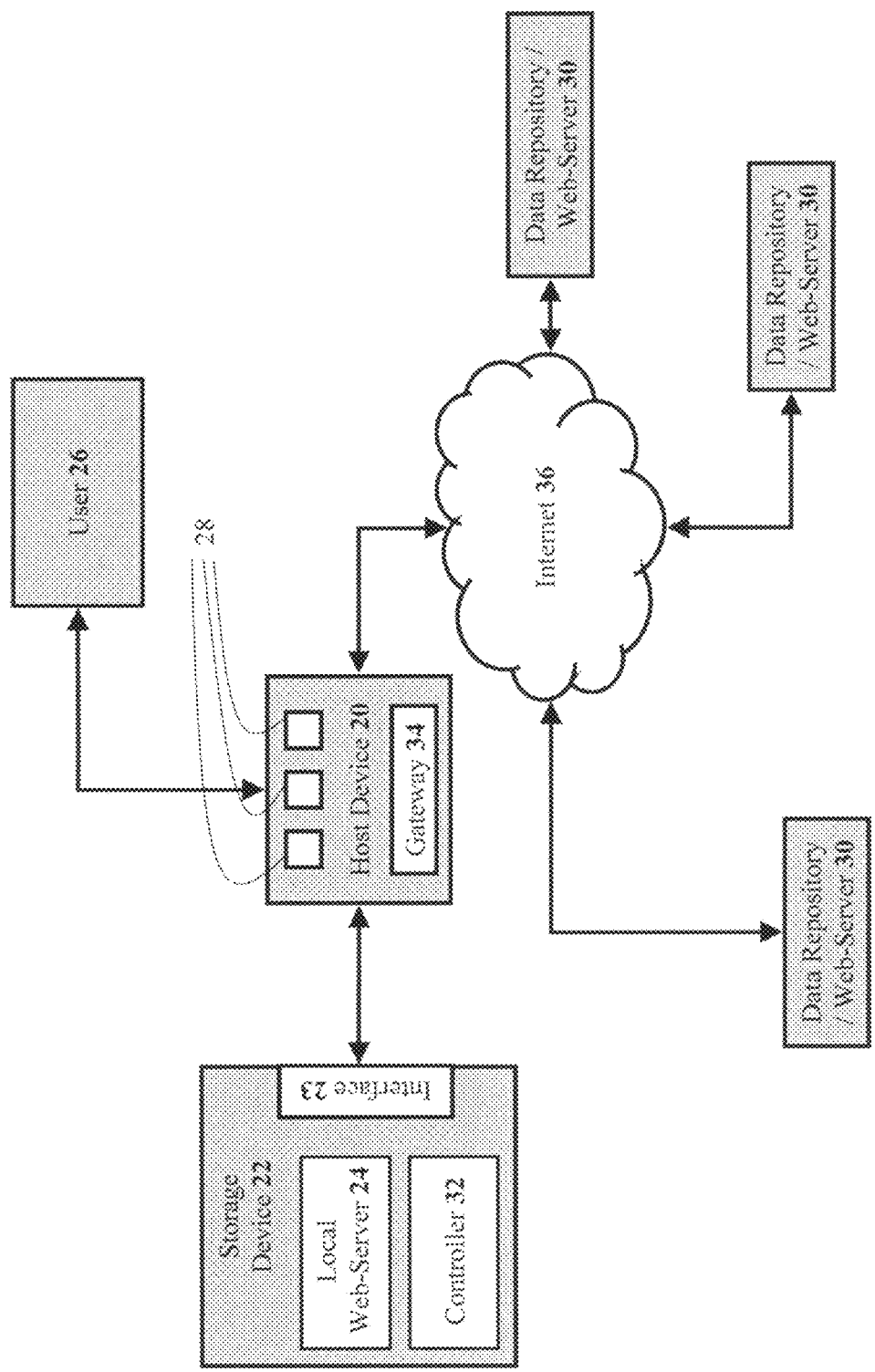
FIG. 1 is a simplified block diagram of a local web-server system, according to a preferred embodiment of the present invention.

Referring now to the drawings, FIG. 1 is a simplified block diagram of a local web-server system, according to a preferred embodiment of the present invention. A host device 20, such as a mobile phone or a personal computer, is shown connected to a storage device 22 via an interface 23. In storage device 22 resides, among other files, a local web-server 24 that can be accessed by host device 20 (either interactively by a user 26 or by applications 28 running on host device 20). While local web-server 24 serves applications 28, local web-server 24 encounters situations in which applications 28 require updated data that may not be available in storage device 22 at that time. In such cases, local web-server 24 can issue a request for update or synchronization from remote data repository/web-servers 30. Such a request will be routed, via a controller 32, through host device 20 acting as a gateway 34. Controller 32 is also the controller of storage device 22. Gateway 34 connects via an internet 36, such as the Internet, to remote data repository/web-servers 30. The data retrieved from data repository/web-servers 30 will be routed back to local web-server 24 via a similar route. Host device 20 does not have to play an active role in this synchronization besides acting as gateway 34.

It is noted that local web-server 24 and controller 32 are typically applications running on storage device 22, and sharing the hardware components (e.g. memory, processor, etc.) of storage device 22. Local web-server 24 and controller 32 can also be implemented as hardware or a combination software-hardware module (e.g. firmware).

Since the amount of data in a typical web-server 30 is large and only a small portion of data is needed by a given user at any given time, there is no need to keep all of the web-server data in storage device 22. Controlled by controller 32, the synchronization system will use the limited storage area of storage device 22 to store only data that has been requested recently, or that is anticipated to be required. The fact that all of the data is not readily-available would seem to lengthen the response time of local web-server 24 in comparison to network-based servers. However, the average performance of local web-server 24 is faster than a conventional network server due to the following two considerations. Since most of the information required by user 26 is available and updated in storage device 22:

(1) User interaction with local storage device 22 is much faster than user interaction with the network.

(2) Local web-server 24 acts as a "cache" web-server, offering service to user 26 when there is no communication with the network.

As the performance of local web-server 24 of the present invention depends on the ability to predict and prepare data that is required by user 26, or by applications 28 running on host device 20, the present invention includes a protocol that is stored in, and managed by, storage device 22. This protocol determines the synchronization that will take place whenever an opportunity to connect on-line is available. This protocol takes into account usage statistics, on external inputs from remote data repository/web-servers 30, and/or on interpretation of the dialogue between host device 20 and storage device 22. Such a protocol is disclosed in Ziv and Pomerantz, U.S. patent application Ser. No. 11/642,897 filed Dec. 21, 2006, and in Ziv et al., U.S. Patent Application No. 60/782,839 filed Mar. 16, 2006, which are assigned to the assignee of the present invention, and are hereby incorporated by reference as if fully set forth herein.

Figure 2:
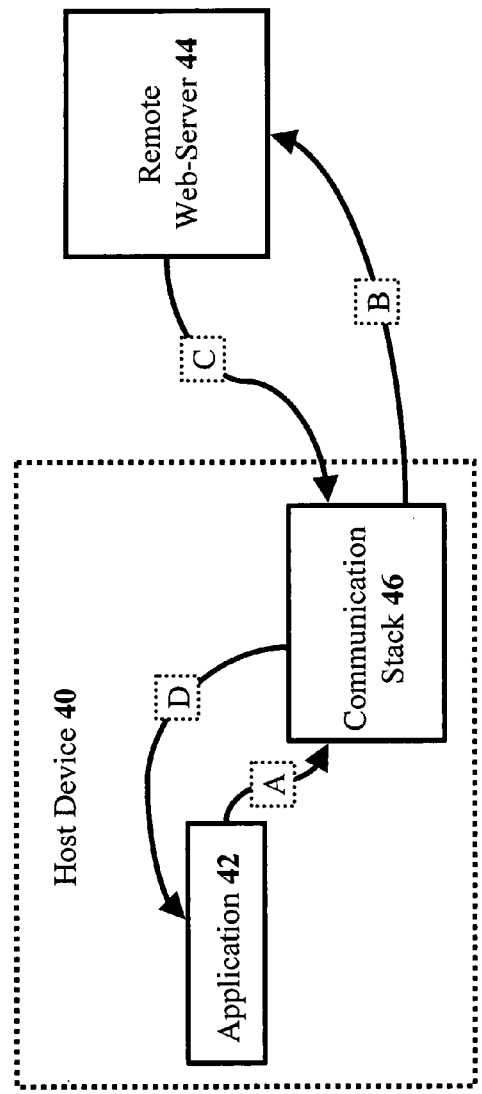
FIG. 2 is a simplified block diagram of the communication in a prior-art system.

FIG. 2 is a simplified block diagram of the communication in a prior-art system. A host device 40, such as a mobile phone, hosts an application 42, such as a web browser, that needs to communicate with a remote web-server 44. Such communication can be done by using data packets (not shown) of the TCP/IP protocol, as is well-known in the art of digital communication, and a communication stack 46, for routing the packets according to their destination address. Application 42 sends packets to communication stack 46 with the IP address of remote web-server 44 (Channel A). Communication stack 46 forwards the packets to remote web-server 44 over internet 36 (Channel B). Remote web-server 44 processes the information request, and sends information back to host device 40 via internet 36 (Channel C). Communication stack 46 receives the packets, and forwards them internally to application 42 (Channel D). Alternatively, communication can be initiated from remote web-server 44, sending TCP/IP packets addressed to application 42.

It should be noted that while FIG. 2 shows a single application and a single remoter web-server, the TCP/IP protocol, and other prior-art methods, allow many applications to communicate with many web-servers, where the protocol guarantees that the information will be properly routed.

Figure 3:
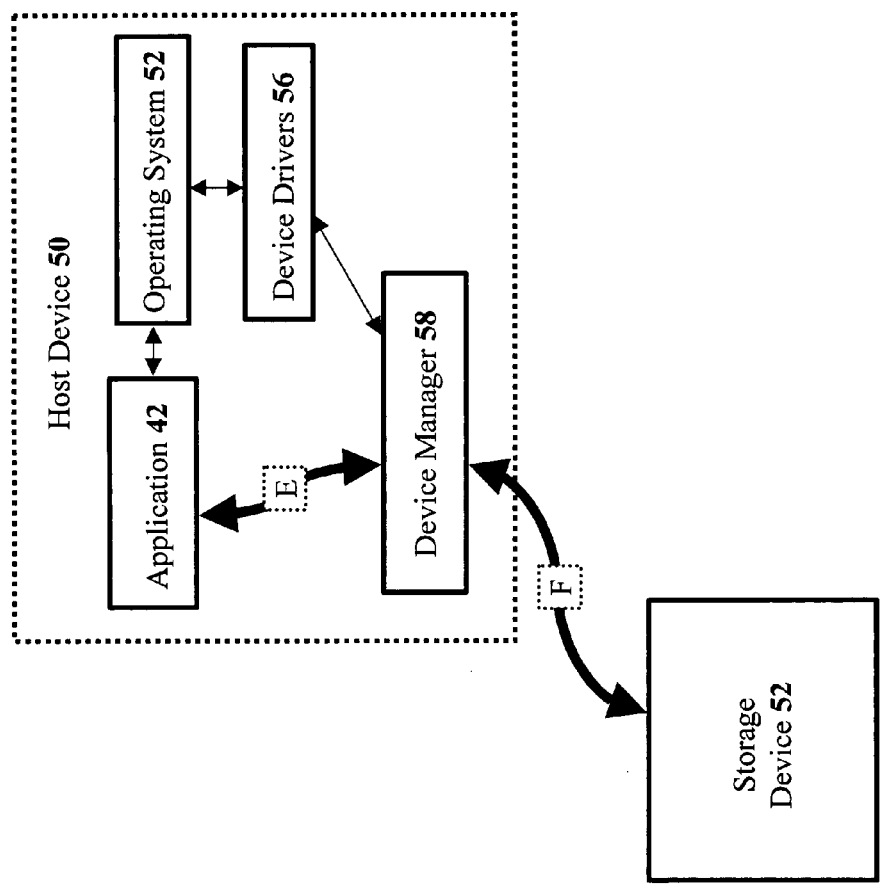
FIG. 3 is a simplified block diagram of the communication in a prior-art system.

FIG. 3 is a simplified block diagram of the communication in a prior-art system. A host device 50, with resident application 42 and a locally-attached storage device 52, such as a SIM card or a memory card, is shown. Application 42, via an operating system 54 and device drivers 56 of host device 50, communicates with a device manager 58 via a file system interface or another storage interface (SI) that are well-known in art of computer engineering (Channel E). Device manager 58 passes the information to storage device 52 (Channel F), then receives a response from storage device 52 (Channel F), and passes the response back to application 42 using the above-mentioned SI (Channel E).

The present invention includes an LWSA module disclosed herein as a software module (using data packets, but can be implemented with alternate communication schemes as well), as a hardware module, or as a combination hardware-software module that interfaces between applications, a storage device, and a communication stack.

In a preferred embodiment, the LWSA performs such interfacing using data packets having an internal address and an IP address. The internal address is used to identify the internal destination of a packet, such as the web services running on a storage device, or the applications that are running on a host device. The IP address is used to identify the external destination of the packet, such as any of the remote web-servers that are communicating with the local web-server. The LWSA can also implement, using prior-art methods, a bi-directional communication scheme for a storage device that cannot autonomously initiate communication with the host device.

Figure 4:
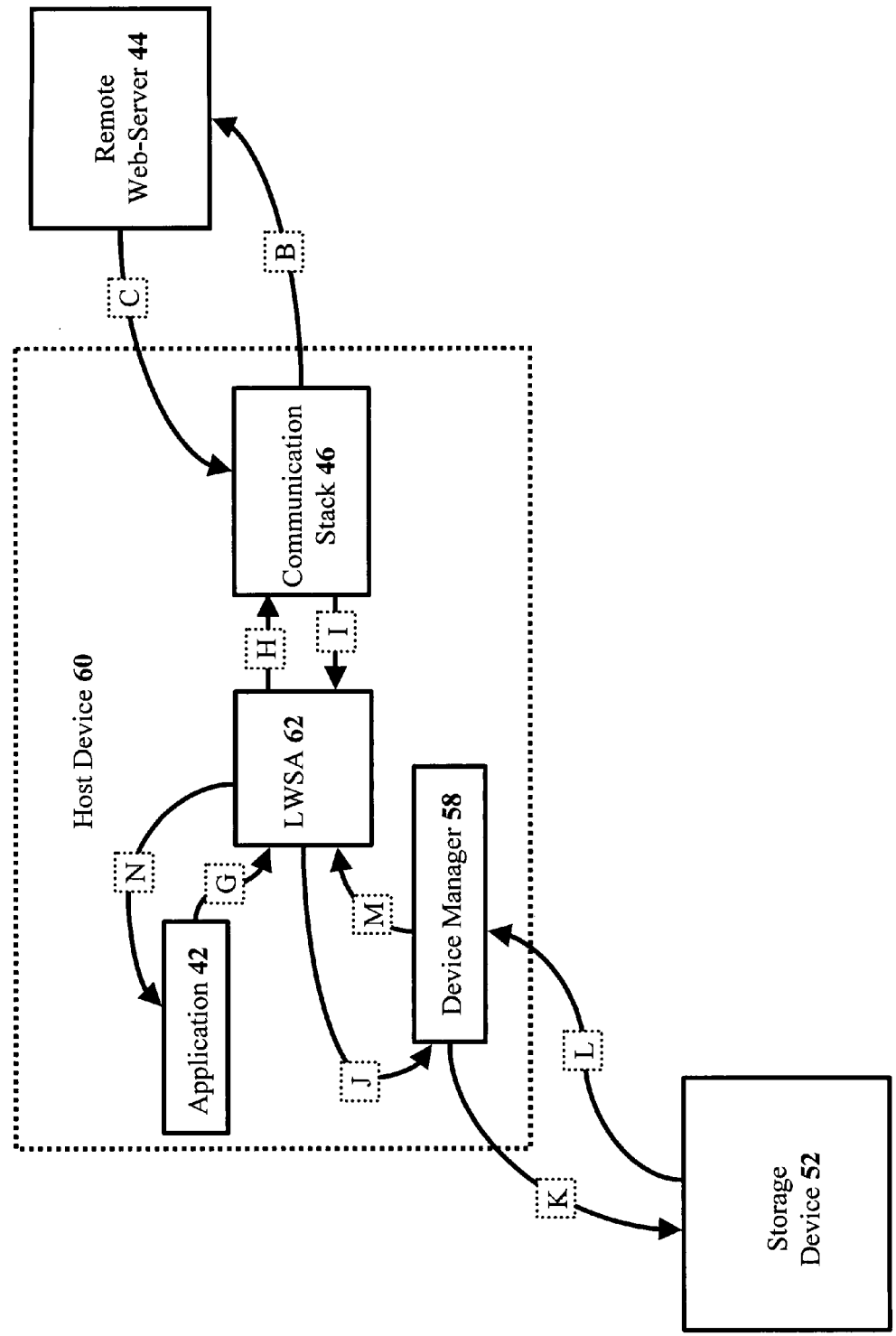
FIG. 4 is a simplified block diagram of the communication, initiated by an application of a host device, of a local web-server system, according to a preferred embodiment of the present invention.

FIG. 4 is a simplified block diagram of the communication, initiated by an application of a host device, of a local web-server system, according to a preferred embodiment of the present invention. A host device 60 hosts application 42, such as a web browser. Application 42 needs to communicate with storage device 52, for retrieving data from storage in storage device 52. Application 42 sends addressed data packets (not shown) to an LWSA 62, of the present invention, that recognizes the destination of the packets (Channel G), and directs the packets to communication stack 46 (via Channel H, and sends the packets on to remote web-server 44 via Channel B) or to device manager 58 (Channel J), according to the packets' destinations. Packets return from remote web-server 44 to communication stack 46 via Channel C, and are directed on to LWSA 62 via Channel I. In the case that LWSA 62 routes the packets to device manager 58 (Channel J), device manager 58 then passes the packets to storage device 52 (Channel K), either directly or by encapsulating the packets according to the communication protocol between host device 60 and storage device 52. Storage device 52 processes the request and sends information to device manager 58 as data packets addressed to application 42 (Channel L). Device manager 58 forwards the packets to LWSA 62 (Channel M). LWSA 62 then sends the packets to application 42 (Channel N).

Figure 5:
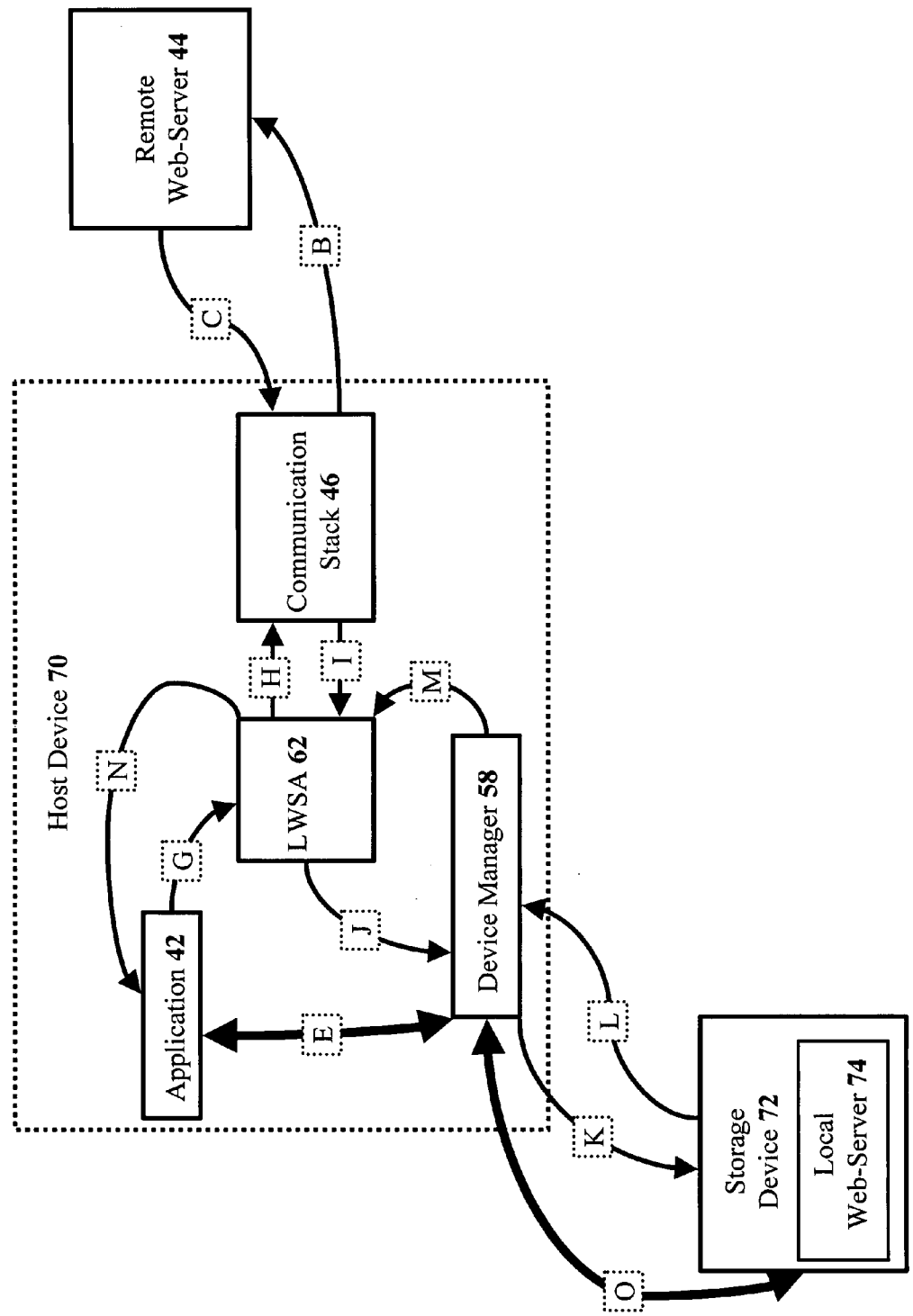
FIG. 5 is a simplified block diagram of the communication, not initiated by an application of a host device, of a local web-server system, according to a preferred embodiment of the present invention.

FIG. 5 is a simplified block diagram of the communication, not initiated by an application of a host device, of a local web-server system, according to a preferred embodiment of the present invention. Since this embodiment is based on a combination of the processes explained in FIGS. 2, 3 and 4, it will be explained only briefly. A host device 70 hosts application 42, such as a web browser, that needs information. A storage device 72 acts as a local web-server 74 for application 42. Application 42 initiates a request for information from the local web-server 74 via LWSA 62 (Channel G). LWSA 62 forwards the request to device manager 58 (Channel J). Device manager 58 then sends the request to storage device 72 (Channel K). Storage device 72 processes the request, and sends a response to device manager 58 (Channel L). The response then routes from device manager 58 to LWSA 62 (Channel M), and from LWSA 62 to application 42 (Channel N).

In some instances, however, local web-server 74 does not have the information required for the response, but "thinks" that the information can be found on remote web-server 44, based on information local web-server 74 has available. In such cases, storage device 72 does not indicate immediately to application 42 that the information is not available. Instead, local web-server 74 lets application 42 wait for a response, and initiates a request via device manager 58 (Channel L), which propagates the request via LWSA 62 (Channel M), from PSWA 62 the request is sent to communication stack 46 (Channel H), and via internet 36, the request is sent to relevant remote web-server 44 (Channel B). Remote web-server 44 processes the request of the local web-server 74, and sends a response to storage device 72 (Channel C). The packets are intercepted by communication stack 46 of host device 70 that recognizes the packets by their destination address, which are internally addressed to storage device 72, and sent to LWSA 62 (Channel I). LWSA 62 then routes the packets to device manager 58 (Channel J), which then sends the packets to storage device 72 (Channel K).

Storage device 72 then uses this information to complete the response to the request of host application 42. The response is then addressed to application 42, and is sent, via device manager 58 (Channel L) and LWSA 62 (Channel M), to application 42 (Channel N). The essence of the present embodiment is that, from the point of view of host application 42, there is no difference between the two last scenarios described regarding FIG. 5 (except for some latency). Therefore, the interaction between storage device 72 and remote web-server 44 is transparent to host device 70 and to application 42.

It should be emphasized that the synchronization between the local web-server 74 and remote web-server 44 is not dependent upon a trigger (e.g. the request mentioned above) by host application 42, and can be initiated by local web-server 74 or by the remote web-server 44.

It should be noted that the above channels of communication do not eliminate nor replace the storage interface communication channels between application 42 and device manager 58 (Channel E), and between device manager 58 and storage device 72 (Channel O). These storage interface communication channels can operate in parallel with the other channels mentioned above.

It should be further noted that the processes described above, with regard to FIG. 5, apply to the two other types of synchronization mentioned in the Summary section of this application. Namely, the synchronization that is initiated by the storage device upon availability of network bandwidth, and the synchronization that is initiated by a remote web-server that is programmed to send updates to certain local web-servers. In a preferred embodiment, a service in the local web-server can initiate communication with a remote web-server, and register the address of the host device and the internal address of the web service in the storage device of that host device. Such registration enables the remote web-server to initiate synchronizations in the local web-server.

While the invention has been described with respect to a limited number of embodiments, it will be appreciated that many variations, modifications, and other applications of the invention may be made.

What is claimed is:

1. A system comprising:
  a host device configured to initiate a first request to receive information, the host device including:
    a network interface to operatively couple to a local storage device, wherein the local storage device is at least one of a flash-memory device, a subscriber identity module (SIM) card, and a memory card; and
    an exchanging mechanism configured to exchange, via the network interface, the information between a local web-server of the local storage device and a remote web-server that is external to the host device, wherein the information is exchanged in response to a second request that is initiated autonomously by the local web-server in response to receipt of the first request and conditioned upon unavailability of the information within the local storage device, wherein the exchanging mechanism is configured to provide communication between the local web-server of the local storage device and the remote web-server without the host device providing a man-machine interface.

2. The system of claim 1, wherein the network interface includes a local web-server agent (LWSA) configured to interface the host device to the exchanging mechanism, wherein the LWSA is implemented in hardware.

3. The system of claim 1, wherein the local web-server is configured to autonomously initiate the second request in response to the local web-server predicting that the information resides on the remote web-server.

4. The system of claim 1, wherein the exchange of the information includes synchronization with the remote web-server to update data residing at a cache of the local storage device, and wherein the synchronization is not initiated by the host device.

5. The system of claim 1, wherein the exchanging mechanism is configured to exchange the information between the local web-server of the local storage device and the remote web-server conditioned on an indication of available bandwidth to enable the exchange of the information between the host device and the remote web-server.

6. The system of claim 1, wherein the local storage device is operative to use a prioritization protocol determined at least in part by data usage statistics, where the data usage statistics include at least one of times of data usage, days of data usage, and dates of data usage.

7. The system of claim 1, wherein the information is routed from the network interface to a device manager of the host device.

8. The system of claim 7, wherein the information is routed from the device manager to the local storage device.

9. The system of claim 1, wherein a request is sent from the local web-server to a device manager of the host device, wherein the device manager communicates the request to the network interface, wherein the network interface communicates the request to the remote web-server.

10. The system of claim 1, wherein the network interface includes a local web-server agent (LWSA) residing in the host device and is configured to manage data communication between the local storage device and a communication stack of the host device, wherein the communication stack is configured to communicate with an external network.

11. The system of claim 1, wherein the network interface is configured to perform interfacing by identifying a plurality of internal addresses of data packets, wherein the internal addresses are each associated with one of the local storage device and the host device.

12. A host device for hosting a local storage device, the host device comprising:
 a memory storing a host application configured to provide a man-machine interface;
 a network interface to communicate with a remote web-server, wherein the network interface is configured to operatively couple to a local storage device, wherein the local storage device is at least one of a flash-memory device, a subscriber identity module (SIM) card, and a memory card; and
 a device manager to enable exchange of information between the remote web-server and the local storage device wherein the device manager is configured to provide communication between the remote web-server and the local storage device without the host device providing the man-machine interface, wherein the communication is initiated autonomously by a local web-server in response to receipt of a request and is conditioned upon unavailability of the information at the local storage device, and
 wherein the information is exchanged according to a prioritization protocol determined at least in part by data usage statistics and wherein the data usage statistics include at least one of times of data usage, days of data usage, dates of data usage, and locations of data usage.

13. The host device of claim 12, wherein the information is exchanged in response to a request that is autonomously initiated by the local web-server after the local web-server determines that the information is unavailable at the local storage device.

14. The host device of claim 12, wherein the exchange of information between the local storage device and the remote web-server is initiated at least in part in response to a request to the local storage device for the information, wherein the request is initiated by the host application.

15. The host device of claim 14, wherein the exchange of information between the local storage device and the remote web-server is initiated at least in part in response to a prediction by the local web-server of the local storage device, wherein the prediction indicates that the information resides on the remote web-server.

16. The host device of claim 12, wherein the exchange of information between the local storage device and the remote web-server is initiated at least in part by the remote web-server.

17. The host device of claim 12, wherein the exchange of information between the local storage device and the remote web-server is initiated at least in part by the local web-server of the local storage device.

18. The host device of claim 12, wherein the local storage device is configured to initiate the exchange of information between the remote web-server and the local storage device in response to an indication of available network bandwidth for communication between the remote web-server and the host device.

19. The host device of claim 12, wherein the host device is configured to initiate a first request to the local storage device for the information prior to the exchange of information.

20. The host device of claim 19, wherein the information is exchanged in response to the initiation of the first request.

21. The host device of claim 20, wherein the information is exchanged in response to a second request that is initiated by the local web-server to the remote web-server in response to the first request and conditioned upon a determination that the information is unavailable in the local storage device.

22. A method comprising:
 requesting information by a host application of a host device in a first request to a local storage device, wherein the local storage device is at least one of a flash-memory device, a subscriber identity module (SIM) card, and a memory card;
 after requesting the information in the first request to the local storage device, sending a second request by a network interface of the host device to a remote web-server, wherein the remote web-server is distinct from the host device and the remote web-server is distinct from the local storage device, and wherein the second request is received by the host device from the local storage device, the second request autonomously initiated by a local web-server of the local storage device in response to unavailability of the information within the local storage device;
 receiving, by the host device, the information from the remote web-server in response to having sent the second request to the remote web-server; and
 communicating, by the host device, the information received from the remote web-server to the local storage device without the host device providing a man-machine interface.

23. The method of claim 22, wherein sending the second request by the host device to the remote web-server is conditioned upon an indication of available bandwidth to enable exchange of the information between the host device and the remote web-server.

* * * * *